(12) United States Patent
Wu et al.

(10) Patent No.: US 12,124,816 B2
(45) Date of Patent: Oct. 22, 2024

(54) CARRY-LOOKAHEAD ADDER, SECURE ADDER AND METHOD FOR PERFORMING CARRY-LOOKAHEAD ADDITION

(71) Applicant: Nuvoton Technology Corporation, Hsinchu Science Park (TW)

(72) Inventors: Kun-Yi Wu, Tainan (TW); Yu-Shan Li, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 117 days.

(21) Appl. No.: 18/089,747

(22) Filed: Dec. 28, 2022

(65) Prior Publication Data

US 2023/0214189 A1 Jul. 6, 2023

(30) Foreign Application Priority Data

Dec. 30, 2021 (TW) .................................. 110149566

(51) Int. Cl.
*G06F 7/76* (2006.01)
*G06F 7/502* (2006.01)
*G06F 7/508* (2006.01)

(52) U.S. Cl.
CPC .............. *G06F 7/764* (2013.01); *G06F 7/502* (2013.01); *G06F 7/508* (2013.01)

(58) Field of Classification Search
None
See application file for complete search history.

(56) References Cited

U.S. PATENT DOCUMENTS 5,301,199 A * 4/1994 Ikenaga ............. G01R 31/3185
 714/732
5,612,911 A * 3/1997 Timko .................... G06F 7/509
 708/670

(Continued)

FOREIGN PATENT DOCUMENTS

EP 3503460 A1 6/2019
TW 443549 U 6/2001

OTHER PUBLICATIONS

Mohamad Karroumi et al., "Addition with Blinded Operands," Apr. 2014, pp. 41-55, vol. 8622, Constructive Side-Channel Analysis and Secure Design.

(Continued)

*Primary Examiner* — Steven G Snyder
(74) *Attorney, Agent, or Firm* — MUNCY, GEISSLER, OLDS & LOWE, PC

(57) ABSTRACT

A carry-lookahead adder is provided. A first mask unit performs first mask operation on first input data with the first mask value to obtain first masked data. A second mask unit performs second mask operation on second input data with the second mask value to obtain second masked data. A first XOR gate receives the first and second mask values to provide a variable value. A half adder receives the first and second masked data to generate a propagation value and an intermediate generation value. A third mask unit performs third mask operation on the propagation value with the third mask value to obtain the third masked data. A carry-lookahead generator provides the carry output and the carry value according to carry input, the generation value, and the propagation value. The second XOR gate receives the third masked data and the carry value to provide the sum output.

20 Claims, 4 Drawing Sheets

(56) References Cited

U.S. PATENT DOCUMENTS

| | | | | |
|---|---|---|---|---|
| 5,877,973 | A * | 3/1999 | Kato | G06F 7/508 |
| | | | | 708/711 |
| 5,898,596 | A | 4/1999 | Reutz | |
| 7,849,119 | B2 * | 12/2010 | Vadi | G06F 7/02 |
| | | | | 708/212 |
| 7,860,915 | B2 * | 12/2010 | Vadi | G06F 7/575 |
| | | | | 708/552 |
| 8,933,731 | B2 * | 1/2015 | Goyal | G06F 7/507 |
| | | | | 327/119 |
| 8,952,721 | B2 * | 2/2015 | Ishiguro | H03K 19/1776 |
| | | | | 326/46 |
| 9,214,209 | B2 * | 12/2015 | Ishiguro | H03K 19/1776 |
| 11,733,966 | B2 * | 8/2023 | Guilley | G06F 21/602 |
| | | | | 708/490 |
| 2006/0195496 | A1 * | 8/2006 | Vadi | H03K 19/1737 |
| | | | | 708/200 |
| 2006/0288070 | A1 * | 12/2006 | Vadi | H03K 19/1737 |
| | | | | 708/524 |
| 2009/0204659 | A1 * | 8/2009 | Torno | G06F 7/506 |
| | | | | 708/714 |
| 2012/0163585 | A1 | 6/2012 | Choi et al. | |
| 2013/0100750 | A1 * | 4/2013 | Ishiguro | G11C 8/10 |
| | | | | 365/189.011 |
| 2013/0191427 | A1 * | 7/2013 | Farrugia | G06F 7/582 |
| | | | | 708/250 |
| 2014/0253215 | A1 * | 9/2014 | Goyal | G06F 7/507 |
| | | | | 327/356 |
| 2015/0103612 | A1 * | 4/2015 | Ishiguro | H03K 19/1776 |
| | | | | 365/230.06 |
| 2021/0165633 | A1 * | 6/2021 | Guilley | G06F 7/508 |
| 2022/0129567 | A1 * | 4/2022 | Tsuchida | G06F 21/31 |

OTHER PUBLICATIONS

An Office Action and Search Report in corresponding TW patent application No. 110149566 mailed Jun. 2, 2022 is attached, 3 pages.

* cited by examiner

CARRY-LOOKAHEAD ADDER, SECURE ADDER AND METHOD FOR PERFORMING CARRY-LOOKAHEAD ADDITION

CROSS REFERENCE TO RELATED APPLICATIONS

This application claims priority of Taiwan Patent Application No. 110149566, filed on Dec. 30, 2021, the entirety of which is incorporated by reference herein.

BACKGROUND OF THE INVENTION

Field of the Invention

The invention relates to a secure adder, and more particularly to a secure carry-lookahead adder (SCLA).

Description of the Related Art

Addition is an important function of many operations, so adders are widely used in various applications, such as signal processing, data protection, and so on. In recent years, encryption and decryption applications have attached great importance to how to protect confidential information, so as to avoid computing data being stolen and analyzed. In general, a common and effective protection mechanism is exclusion (or mask) technology, which utilizes random numbers and important data (or variables) in an encryption and decryption algorithm to perform an exclusive-OR (XOR) operation to complete the mask protection mechanism. Therefore, encryption and decryption applications need a secure adder that can perform secure addition operations.

A secure addition operation requires a secure adder that can complete the addition operation without removing the mask of input data and revealing the original value of the input data during the calculation process, to provide the outputs protected by mask values. Secure adders that can perform secure addition operations are widely used in various integrated circuits (ICs) and in electronic products used in encryption and decryption applications.

Therefore, a secure adder with low manufacturing cost is desirable.

BRIEF SUMMARY OF THE INVENTION

A carry-lookahead adder, a secure adder, and a method for performing carry-lookahead addition are provided. An embodiment of a carry-lookahead adder is provided. The carry-lookahead adder includes a first mask unit, a second mask unit, a first exclusive-OR (XOR) gate, a half adder, a third mask unit, a logic circuit, a carry-lookahead generator, and a second XOR gate. The first mask unit is configured to perform a first mask operation on first input data corresponding to a second mask value with a first mask value to obtain first masked data. The first mask value is different from the second mask value. The second mask unit is configured to perform a second mask operation on second input data corresponding to the first mask value with the second mask value to obtain second masked data. The first XOR gate is configured to receive the first mask value and the second mask value to provide a variable value. The half adder is configured to receive the first masked data and the second masked data to generate a propagation value and an intermediate generation value. The third mask unit is configured to perform a third mask operation on the propagation value with a third mask value to obtain third masked data. The logic circuit is configured to provide a generation value according to the propagation value, the intermediate generation value and the variable value. The carry-lookahead generator is configured to provide a carry output and a carry value according to a carry input, the generation value and the propagation value. The second XOR gate is configured to receive the third masked data and the carry value to provide a sum output.

Moreover, an embodiment of a secure adder is provided. The secure adder includes a mask generator and a carry-lookahead adder. The mask generator includes a random number generator and a first mask unit. The random number generator is configured to randomly generate a first mask value, a second mask value and a third mask value. The first mask unit is configured to perform a first mask operation on first data with the first mask value to obtain first masked data, and to perform a second mask operation on second data with the second mask value to obtain second masked data, wherein the first mask value is different from the second mask value. The carry-lookahead adder includes a second mask unit, a third mask unit, a first exclusive-OR (XOR) gate, a half adder, a fourth mask unit, a logic circuit, a carry-lookahead generator, and a second XOR gate. The second mask unit is configured to perform a third mask operation on the first masked data with the second mask value to obtain third masked data. The third mask unit is configured to perform a fourth mask operation on the second masked data with the first mask value to obtain fourth masked data. The first XOR gate is configured to receive the first mask value and the second mask value to provide a variable. The half adder is configured to receive the third masked data and the fourth masked data to generate a propagation value and an intermediate generation value. The fourth mask unit is configured to perform a fifth mask operation on the propagation value with the third mask value to obtain fifth masked data. The logic circuit is configured to provide a generation value according to the propagation value, the intermediate generation value and the variable value. The carry-lookahead generator is configured to provide a carry output and a carry value according to a carry input, the generation value and the propagation value. The second XOR gate is configured to receive the fifth masked data and the carry value to provide a sum output.

Furthermore, an embodiment of a method for performing carry-lookahead addition is provided. A first mask operation is performed on first input data corresponding to a second mask value with a first mask value to obtain first masked data. A second mask operation is performed on second input data corresponding to the first mask value with the second mask value to obtain second masked data. The first mask value is different from the second mask value. A variable value is obtained according to the first mask value and the second mask value. A half adder is used to obtain an intermediate generation value and a propagation value according to the first masked data and the second masked data. A third mask operation is performed on the propagation value with a third mask value to obtain third masked data. A generation value is obtained according to the propagation value, the intermediate generation value and the variable value. A carry output and a carry value are obtained by a carry-lookahead generator according to a carry input, the generation value and the propagation value. A sum output is obtained according to the third masked data and the carry value. The first mask operation, the second mask operation and the third mask operation are performed by different exclusive-OR (XOR) gates.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
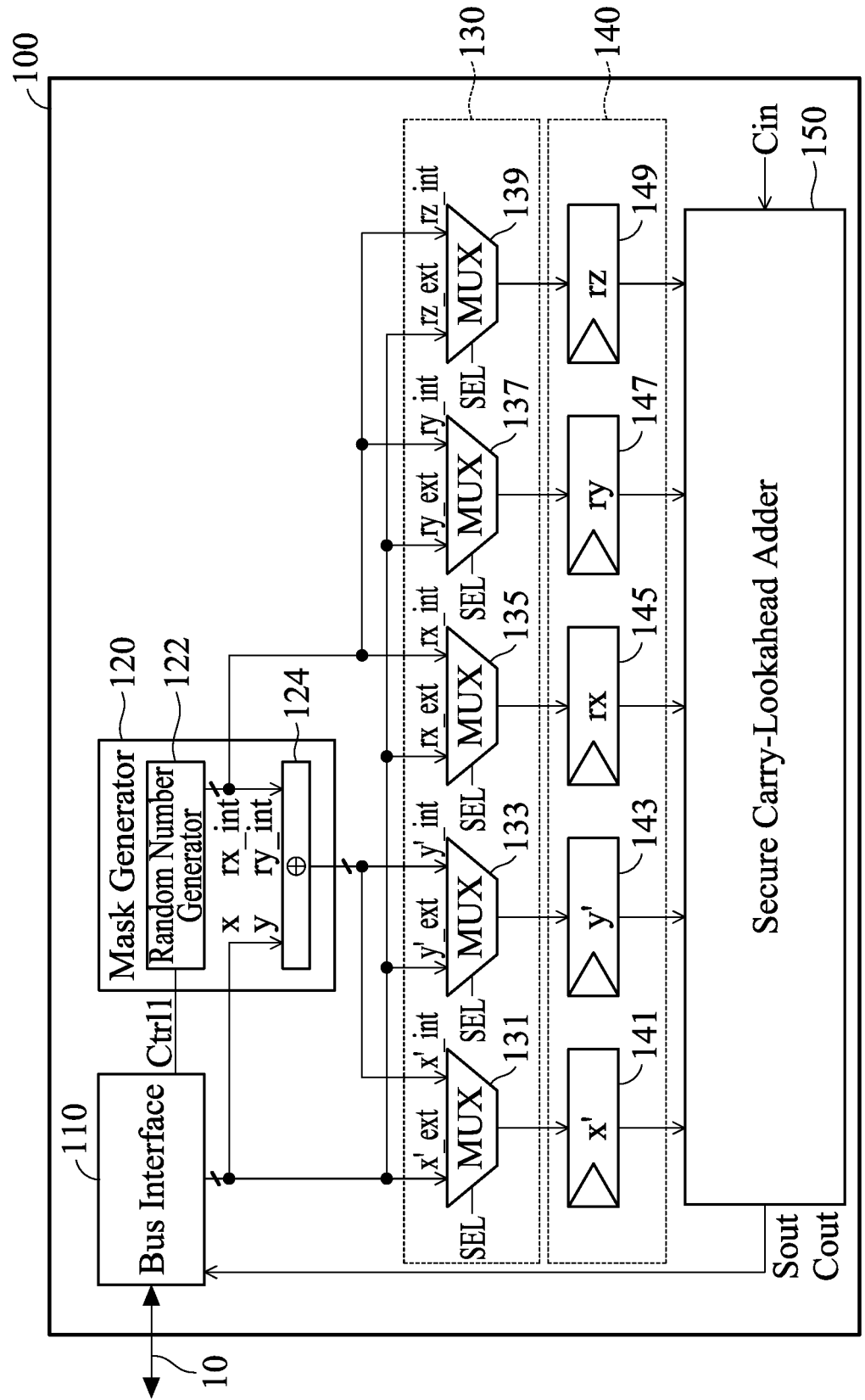
FIG. 1 shows a secure adder according to some embodiments of the invention.

FIG. 1 shows a secure adder 100 according to some embodiments of the invention. The secure adder 100 may be implemented in an integrated circuit (IC) (not shown). In addition, the secure adder 100 can complete the addition operation without leaking operands, and provide mask protection for the output result. In some embodiments, the secure adder 100 is configured to perform data transfer via the bus 10 and other circuits (not shown) within the IC. For example, a processor (not shown) may provide a plurality of input data (or operands) to the secure adder 100 via the bus 10 to perform the addition operations. In some embodiments, the input data may be unmasked raw data. In some embodiments, the input data may be masked data. Furthermore, after completing the addition operations, the secure adder 100 is configured to provide the masked operation result to the processor via the bus 10.

In FIG. 1, the secure adder 100 includes a bus interface 110, a mask generator 120, a selection circuit 130, a storage circuit 140 and a secure carry-lookahead adder (SCLA) 150. The bus interface 110 is coupled to the bus 10 and configured to provide various input data (e.g., operands, mask values, control signals, etc.) from the bus 10 to the mask generator 120, the selection circuit 130 and the secure carry-lookahead adder 150. Moreover, after the addition operation is completed, the bus interface 110 is configured to provide output data (e.g., operation results) from the secure carry-lookahead adder 150 to the bus 10.

The mask generator 120 includes a random number generator (RNG) 122 and a mask unit 124. According to the control signal Ctrl1 from the bus interface 110, the random number generator 122 is configured to generate a plurality of random numbers as the mask values rx_int, ry_int and rz_int. It should be noted that the mask value rx_int is different from the mask value ry_int, i.e., the mask value rx_int is independent of the mask value ry_int. Furthermore, the mask value rz_int may or may not be related to the mask value rx_int and/or the mask value ry_int. The random number generator 122 is configured to provide the mask values rx_int and ry_int to the mask unit 124 and to provide the mask values rx_int, ry_int and rz_int to the selection circuit 130. In some embodiments, the control signal Ctrl1 is provided by an external circuit (i.e., other circuits in the IC) via the bus 10. In some embodiments, the bus interface 110 is configured to generate the control signal Ctrl1 to the mask generator 120 according to the input data from the bus 10. In addition, the mask unit 124 is configured to perform mask operations on the data x and the data y according to the mask value rx_int and the mask value ry_int, respectively, so as to obtain the masked data x'_int and the masked data y'_int. In general, the mask operation means to perform an exclusive-OR (XOR) operation between multi-bit data and multi-bit mask value, so as to mask out a portion of the bits in the data and provide the masked data, thereby preventing from being stolen. Furthermore, the mask unit 124 is configured to further provide the masked data x'_int and the masked data y'_int to the selection circuit 130. In addition, the data x and the data y are provided by the external circuit via the bus 10.

The selection circuit 130 includes multiplexers (MUX) 131, 133, 135, 137 and 139. In such embodiment, the multiplexers 131, 133, 135, 137 and 139 are controlled by the same selection signal SEL. In some embodiments, the selection signal SEL is provided by an external circuit via the bus 10. In some embodiments, the bus interface 110 is configured to generate the selection signal SEL to the selection circuit 130 according to the input data from the bus 10. When the selection signal SEL has a first logic level, the selection signal SEL is configured to control the multiplexers 131, 133, 135, 137 and 139 to provide the masked data x'_ext and y'_ext and the mask values rx_ext, ry_ext and rz_ext from the bus interface 110 to the storage circuit 140 and then stored in the corresponding registers (or memory). The mask values rx_ext, ry_ext and rz_ext and the masked data x'_ext and y'_ext are provided by the external circuit via the bus 10. On the other hand, when the selection signal SEL has a second logic level, the selection signal SEL is configured to control the multiplexers 131, 133, 135, 137 and 139 to provide the masked data x'_int and y'_int and the mask values rx_int, ry_int and rz_int from the mask generator 120 to the storage circuit 140 and then stored in the corresponding registers (or storage devices).

For the secure adder 100, the masked data x'_int and y'_int and the mask values rx_int, ry_int and rz_int are generated by the mask generator 120. As described above, the generation of the masked data x'_int is related to the mask value rx_int, and the generation of the masked data y'_int is related to the mask value ry_int. On the other hand, for the secure adder 100, the masked data x'_ext and y'_ext and the masked values rx_ext, ry_ext and rz_ext are provided by the external circuits. In addition, the generation of the masked data x'_ext is related to the mask value rx_ext, and the generation of the masked data y'_ext is related to the mask value ry_ext. It should be noted that the mask value rx_ext is different from the mask value ry_ext, i.e., the mask value rx_ext is independent of the mask value ry_ext. Furthermore, the mask value rz_ext may or may not be related to the mask value rx_ext and/or the mask value ry_ext.

The storage circuit 140 includes the registers 141, 143, 145, 147 and 149. The register 141 is configured to store the masked data x'_int or the masked data x'_ext from the multiplexer 131 as the input data x' of the secure carry-lookahead adder 150. In addition, the register 143 is configured to store the masked data y'_int or the masked data y'_ext from the multiplexer 133 as the input data y' of the secure carry-lookahead adder 150. For the secure carry-lookahead adder 150, the input data x' and the input data y' are masked data. Furthermore, the register 145 is configured to store the mask value rx_int or the mask value rx_ext from the multiplexer 135 as the mask value rx of the secure carry-lookahead adder 150. The register 147 is configured to store the mask value ry_int or the mask value ry_ext from the multiplexer 137 as the mask value ry of the secure carry-lookahead adder 150. The register 149 is configured to store the mask value rz_int or the mask value rz_ext from the multiplexer 139 as the mask value rz of the secure carry-lookahead adder 150. Next, the secure carry-lookahead adder 150 is configured to generate a carry output Cout and a sum output Sout according to the input data x' and y', the mask values rz, ry and rz, and the carry input Cin from the storage circuit 140.

Figure 2:
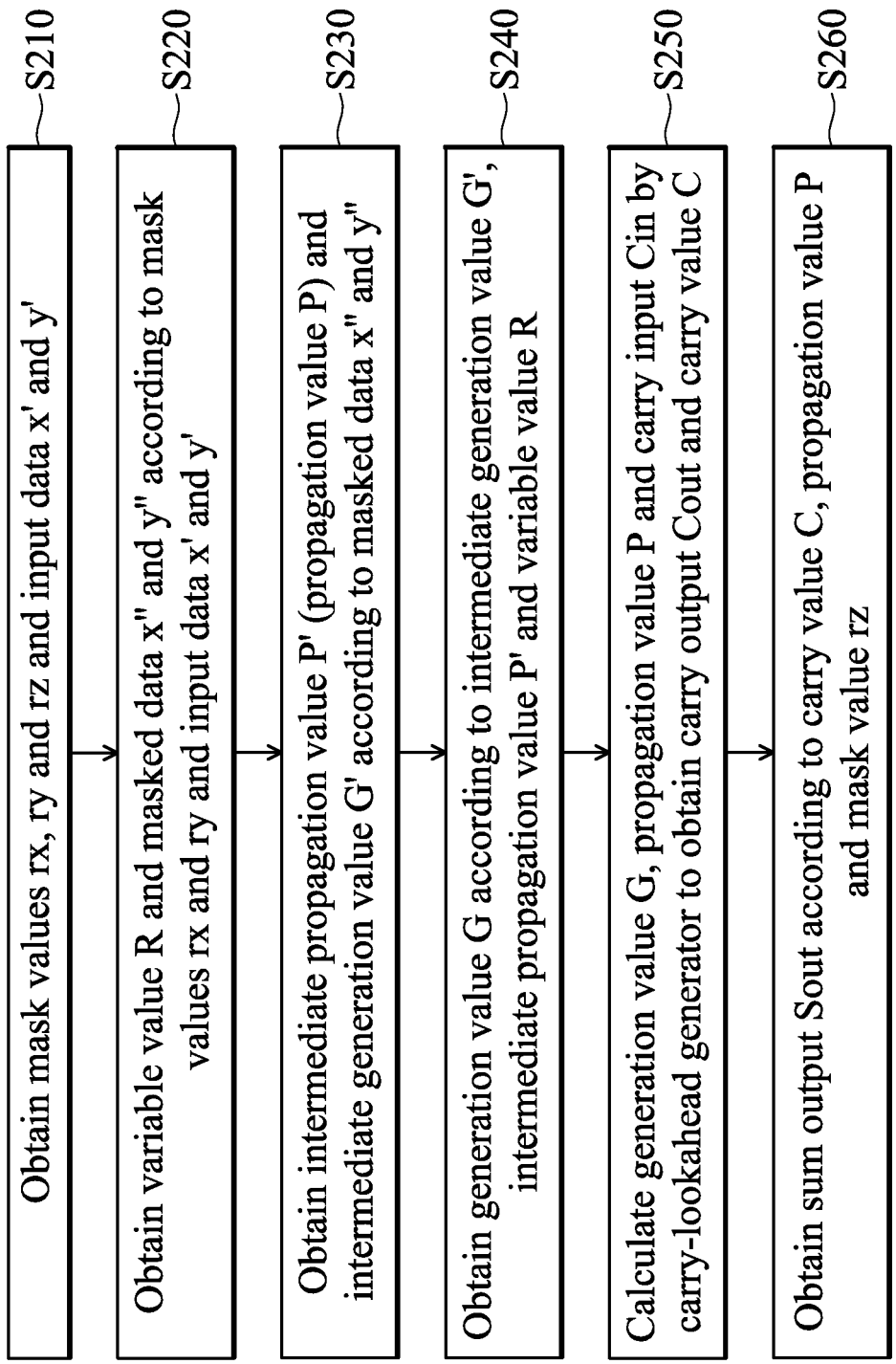
FIG. 2 shows a method of performing carry-lookahead addition for the secure carry-lookahead adder of FIG. 1 according to some embodiments of the invention.

FIG. 2 shows a method of performing carry-lookahead addition for the secure carry-lookahead adder 150 of FIG. 1 according to some embodiments of the invention. In some embodiments, the method of FIG. 2 for performing the carry-lookahead addition may be performed by other circuits (e.g., a processor).

First, in step S210, the mask values rx, ry and rz and the input data x' and y' are obtained. As described above, the input data x' is obtained by performing a mask operation (e.g., XOR operation "$\oplus$") on the data x with the mask value rx, as shown in the following equation (1):

$$x' = x \oplus rx \qquad (1).$$

Similarly, the input data y' is obtained by performing a mask operation (e.g., XOR operation) on the data y with the mask value ry, as shown in the following equation (2):

$$y' = y \oplus ry \qquad (2).$$

Furthermore, the mask value rz is used to perform a mask operation on the result of the carry-lookahead addition operation, so as to provide security protection for the output, which will be described in detail later. It should be noted that the mask value ry is different from the mask value rx, i.e., the data x and the data y use different mask values to perform the mask operations.

In step S220, the variable value R is obtained according to the mask value rx and the mask value ry, as shown in the following formula (3):

$$R = rx \oplus ry \qquad (3).$$

As described above, the mask value ry is different from the mask value rx, so the variable value R will not be equal to 0. In addition, a mask operation (i.e., XOR operation) is performed on the input data x' with the mask value ry, so as to obtain the masked data x", and a mask operation is performed on the input data y' with the mask value rx, so as to obtain the masked data y", that are shown in the following equations (4) and (5) respectively:

$$x'' = x' \oplus ry \qquad (4); \text{ and}$$

$$y'' = y' \oplus rx \qquad (5).$$

Since the XOR operation has the properties of commutative property and associative property, according to equations (1) and (3), equation (4) can be rewritten as equation (6), so that the masked data x" is obtained by performing an XOR operation on the data x and the variable value R, as shown below:

$$x'' = x' \oplus ry = (x \oplus rx) \oplus ry = x \oplus (rx \oplus ry) = x \oplus R \qquad (6).$$

Similarly, by substituting equation (2) and equation (3) into equation (5), the masked data y" is obtained by performing an XOR operation on the data y and the variable value R, as shown in the following Equation (7):

$$y'' = y' \oplus rx = (y \oplus ry) \oplus rx = y \oplus (ry \oplus rx) = y \oplus R \qquad (7).$$

In step S230, according to the masked data x" and the masked data y", an intermediate propagation value P' is obtained, as shown in the following formula (8):

$$P' = x'' \oplus y'' \qquad (8).$$

Next, substituting equations (6) and (7) into equation (8), it is obtained that the intermediate propagation value P' (i.e., x"$\oplus$y") is equal to the propagation value P (i.e., x$\oplus$y), as shown in the following formula (9) shows:

$$P' = x'' \oplus y'' = (x \oplus R) \oplus (y \oplus R) = x \oplus y = P \qquad (9).$$

In addition, the intermediate generation value G' is obtained by performing an AND operation ("&") on the masked data x" and the masked data y", as shown in the following equation (10):

$$G' = x'' \& y'' \qquad (10).$$

In step S240, according to the distributive property between the AND operation and the XOR operation (e.g., (a$\oplus$b)&c=(a&c)$\oplus$(b&c)) and the equations (6) and (7), the AND operation of the equation (10) is assigned to the lowest-level operation, as shown in the following equation (11):

$$G' = x'' \& y'' = (x \oplus R) \& (y \oplus R) = (x \& (y \oplus R)) \oplus (R \& (y \oplus R)) = (x \& y) \oplus (x \& R) \oplus (R \& y) \oplus (R \& R) = (x \& y) \oplus (x \& R) \oplus (R \& y) \oplus R \qquad (11).$$

Next, for the adder, the AND operation is performed on the data x and the data y to obtain the generation value G, i.e., G=x&y. Thus, equation (11) can be rewritten as equation (12), as shown below:

$$G' = (x \& y) \oplus (x \& R) \oplus (R \& y) \oplus R = G \oplus (x \& R) \oplus (y \& R) \oplus R \qquad (12).$$

Next, according to the distributive property between AND operation and XOR operation, equation (12) can be rewritten as equation (13), as shown below:

$$G' = G \oplus (x \& R) \oplus (y \& R) \oplus R = G \oplus ((x \oplus y) \& R) \oplus R \qquad (13).$$

Next, equation (9) is substituted into equation (13) to obtain equation (14), as shown below:

$$G' = G \oplus (P' \& R) \oplus R \qquad (14).$$

Thus, according to the associative property of the XOR operation and the equation (14), the generation value G is obtained according to the equation (15), as shown below:

$$G = G' \oplus (P' \& R) \oplus R \qquad (15).$$

In step S250, the carry-lookahead generator is configured to obtain the carry output Cout and the carry value C according to the propagation value P obtained by the equation (9), the generation value G obtained by the equation (15), and the carry input Cin. The carry-lookahead generator will be described later. In some embodiments, the initial value of the carry input Cin is zero. In some embodiments, the carry input Cin is provided by an external circuit via the bus 10.

In step S260, according to the operation principle of the adder, the XOR operation is performed on the data x, the data y and the carry value C to obtain the sum output Sout, as shown in the following equation (16):

$$Sout = (x+y) = x \oplus y \oplus C = P' \oplus C \qquad (16).$$

Next, an XOR operation is performed on the sum output Sout and the mask value rz, so as to satisfy the condition that all the input values and the output values have be masked in the addition operations. Thus, the masked sum output Sout is obtained, as shown in the following equation (17):

$$Sout = (P' \oplus rz) \oplus C \qquad (17).$$

In general, the carry-lookahead generator can obtain the carry input Cout and the carry value C according to the propagation value P, the generation value G and the carry input Cin, as shown in the following equation (18):

$$\{Cout, C\} = CLG(G, P, Cin) \qquad (18),$$

where CLG is a function of the carry-lookahead generator. Therefore, equation (19) is obtained by substituting equation (18) into equation (17), as shown below:

$$Sout = (P' \oplus rz) \oplus CLG(G, P, Cin) \qquad (19).$$

Next, substituting the generated value G of equation (15) into equation (19) can obtain equation (20), as shown below:

$$Sout = (P' \oplus rz) \oplus CLG(G, P, Cin) = (P' \oplus rz) \oplus CLG(G' \oplus (P' \& R) \oplus R, P, Cin) \qquad (20).$$

Next, substituting the propagation value P and the intermediate propagation value P' of equation (9) into equation (20) can obtain equation (21), as shown below:

$$Sout = (P' \oplus rz) \oplus CLG(G' \oplus (P' \& R) \oplus R, P, Cin) = ((x'' \oplus y'') \oplus rz) \oplus CLG(G' \oplus ((x'' \oplus y'') \& R) \oplus R, (x'' \oplus y''), Cin) \qquad (21).$$

Next, substitute the intermediate generated value G' of equation (10) into equation (21) to obtain equation (22), as shown below:

$$Sout = (x'' \oplus y'' \oplus rz) \oplus CLG(((x'' \& y'') \oplus ((x'' \oplus y'') \& R) \oplus R), (x'' \oplus y''), Cin) = (x'' \oplus y'' \oplus rz) \oplus CLG(((x'' \& y'') \oplus R \oplus (x'' \oplus y'') \& R)), (x'' \oplus y''), Cin) \qquad (22).$$

Therefore, the logic circuit of the safe carry-lookahead adder 150 is obtained according to the equation (22) and the equation (3) through equation (5).

Figure 3:
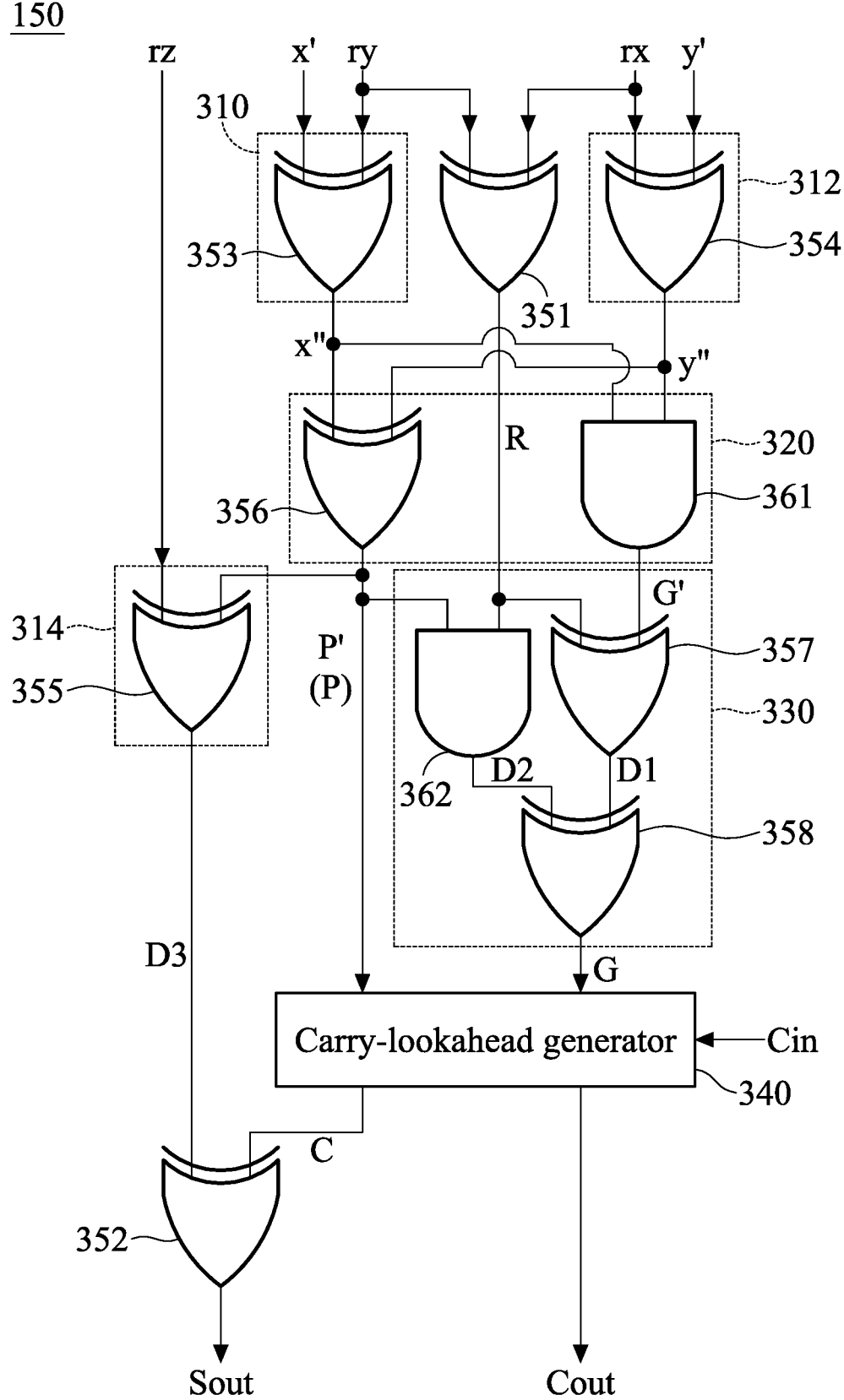
FIG. 3 shows an exemplary circuit of the secure carry-lookahead adder in FIG. 1 according to some embodiments of the invention.

FIG. 3 shows an exemplary circuit of the secure carry-lookahead adder 150 in FIG. 1 according to some embodiments of the invention. The secure carry-lookahead adder 150 includes the mask units 310, 312 and 314, a half adder 320, a logic circuit 330, a carry-lookahead generator 340, and the XOR gates 351 and 352.

The mask unit 310 includes an XOR gate 353, which is configured to perform a mask operation (i.e., XOR operation) on the input data x' with the mask value ry, so as to obtain the masked data x", as shown in equation (4). In addition, the mask unit 312 includes an XOR gate 354, which is configured to perform a mask operation (i.e., XOR operation) on the input data y' with the mask value rx, so as to obtain the masked data y", as shown in equation (5). The XOR gate 351 is configured to perform an XOR operation on the mask value ry and the mask value rx to obtain the variable value R, as shown in equation (3).

The half adder 320 includes the XOR gate 356 and the AND gate 361. The XOR gate 356 is configured to receive the masked data x" and the masked data y", and output the intermediate propagation value P', as shown in equation (9). As previously described, the intermediate propagation value P' (i.e., x"⊕y") is equal to the propagation value P (i.e., x⊕y). Moreover, the AND gate 361 is configured to receive the masked data x" and the masked data y", and output an intermediate generation value G', as shown in equation (10).

The logic circuit 330 is configured to provide the generation value G according to the variable value R, the intermediate generation value G', and the intermediate propagation value P' (i.e., the propagation value P). In some embodiments, logic circuit 330 includes the XOR gate 357, the XOR gate 358, and the AND gate 362. The XOR gate 357 is configured to receive the variable value R and the intermediate generation value G', and output the intermediate data D1. The AND gate 362 is configured to receive the variable value R and the intermediation propagation value P' (i.e., the propagation value P), and output the intermediate data D2. Additionally, the XOR gate 358 is configured to receive the intermediate data D1 and D2 and output the generation value G to the carry-lookahead generator 340. Thus, the carry-lookahead generator 340 is configured to obtain the carry output Cout and the carry value C according to the propagation value P (i.e., the intermediate propagation value P'), the generation value G, and the carry input Cin. The operation of the carry-lookahead generator 340 will be described later.

The mask unit 314 includes an XOR gate 355 that is configured to perform a mask operation on the intermediate propagation value P' (i.e., the propagation value P) with the mask value rz, so as to obtain the masked data D3. It should be noted that due to longer delay in the delivery path within the carry-lookahead generator 340, the mask value rz is used to first perform a mask operation on the intermediate propagation value P' through the mask unit 314. Next, the XOR gate 352 is configured to receive the masked data D3 and the carry value C and provide the sum output Sout.

After obtaining the sum output Sout, the safe carry-lookahead adder 150 is configured to provide the sum output Sout and the carry output Cout to the bus interface 110, so as to provide to other circuits (e.g., processors) via the bus 10 for subsequent operations. As described above, the sum output Sout is the masked data. Therefore, in addition to providing the sum output Sout and the carry output Cout, the secure adder 100 is configured to further provide the mask value rz to other circuits. Therefore, other circuits can use the mask value rz to remove the mask of the sum output Sout, so as to obtain the original value of the sum output Sout.

In FIG. 3, the XOR gate 356 and the XOR gate 355 are configured to perform the operation of $(x''\oplus y'')\oplus rz$ in the equation (22). In addition, the AND gate 361 and the XOR gate 357 are configured to perform the operation of $(x''\& y'')\oplus R$ in the equation (22). Furthermore, the XOR gate 356 and the AND gate 362 are configured to perform the operation of $(x''y'')\& R$ in the equation (22).

Figure 4:
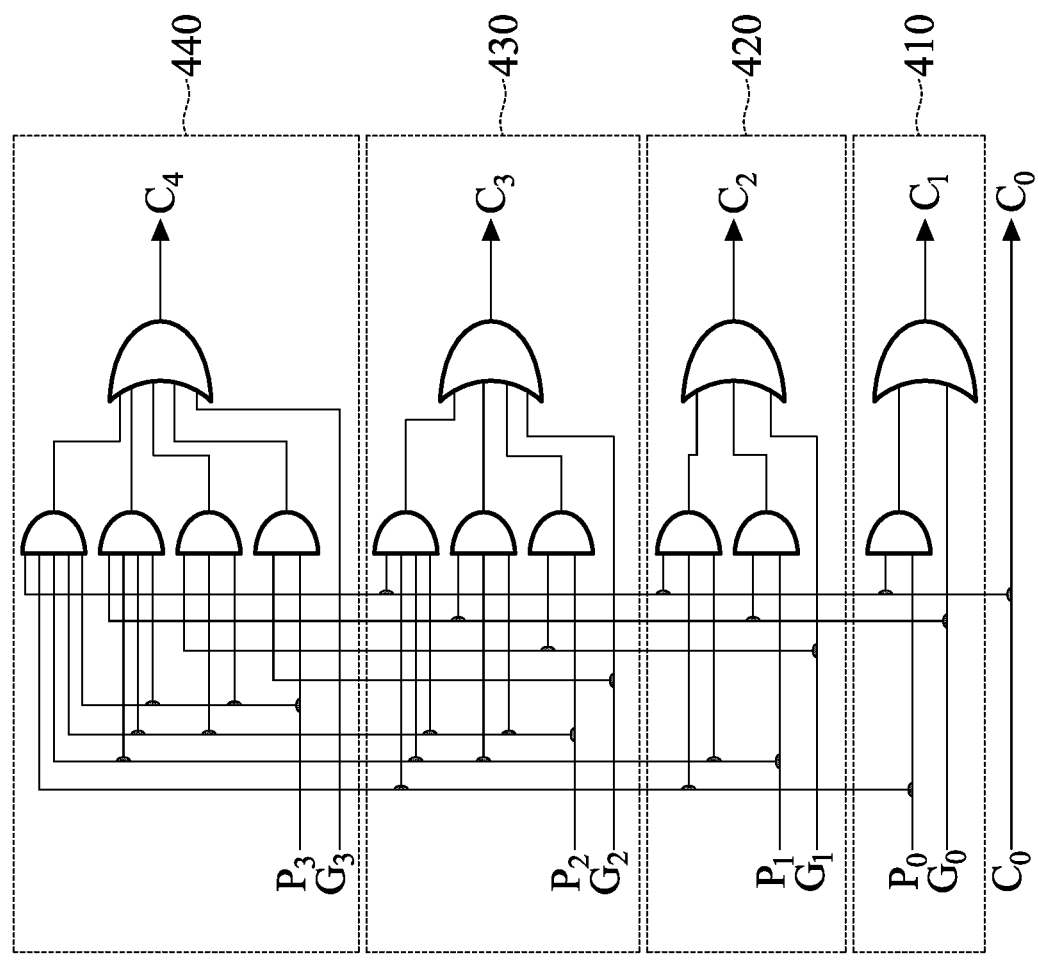
FIG. 4 shows a 4-bit carry-lookahead generator illustrating the carry-lookahead generator of FIG. 3 according to some embodiments of the invention.

FIG. 4 shows a 4-bit carry-lookahead generator 400 illustrating the carry-lookahead generator 340 of FIG. 3 according to some embodiments of the invention. In such embodiment, the propagation value P is 4-bit data consisting of the propagation signals (or bits) $P_3$, $P_2$, $P_1$ and $P_0$, i.e., $P=[P_3, P_2, P_1, P_0]$. The generation value G is 4-bit data consisting of the generation signals (or bits) $G_3$, $G_2$, $G_1$ and $G_0$, i.e., $G=[G_3, G_2, G_1, G_0]$. In addition, the input signal (or bit) $C_0$ is 1-bit data composed of the carry input Cin, i.e., $C_0=Cin$. According to the propagation value P, the generation value G, and the carry input Cin, the carry-lookahead generator 400 is configured to perform the operations of equations (23) to (26) to obtain the carry output Cout and the carry value C. The carry value C is 4-bit data composed of output signals (or bits) $C_3$, $C_2$, $C_1$ and $C_0$, i.e., $C=[C_3, C_2, C_1, C_0]$. In addition, the carry output Cout is determined by the output signal (or bit) $C_4$, i.e., $Cout=C_4$. Equations (23) to (26) are shown below:

$$C_1 = G_0 | P_0 \& C_0 \qquad (23);$$

$$C_2 = G_1 | P_1 \& G_0 | P_1 \& P_0 \& C_0 \qquad (24);$$

$$C_3 = G_2 | P_2 \& G_1 | P_2 \& P_1 \& G_0 | P_2 \& P_1 \& P_0 \& C_0 \qquad (25); \text{ and}$$

$$C_4 = G_3 | P_3 \& G_2 | P_3 \& P_2 \& G_1 | P_3 \& P_2 \& P_1 \& G_0 | P_3 \& P_2 \& P_1 \& P_0 \& C_0 \quad (26).$$

As described above, "|" means to perform an OR operation, and "&" means to perform an AND operation.

The carry-lookahead generator 400 includes the logic circuits 410, 420, 430, and 440. The logic circuit 410 is configured to perform the operation of equation (23) to generate the signal $C_1$ according to the signal $C_0$, the signal $G_0$ and the signal $P_0$. The logic circuit 420 is configured to perform the operation of equation (24) to generate the signal $C_2$ according to the signal $C_0$, the signals $G_0$ and $G_1$, and the signals $P_0$ and $P_1$. Furthermore, the logic circuit 430 is configured to perform the operation of equation (25) to generate the signal $C_3$ according to the signal $C_0$, the signals $G_0$ through $G_2$, and the signals $P_0$ through $P_2$. The logic circuit 440 is configured to perform the operation of equation (26) to generate the signal $C_4$ according to the signal $C_0$, the signals $G_0$ through $G_3$, and the signals $P_0$-$P_3$. It should be noted that the 4-bit carry-lookahead generator 400 is only an example, and is not intended to limit the invention. More-bit or less-bit carry-lookahead generator can be used in the secure adder of the invention. Moreover, the number of bits of the carry value C generated by the carry-lookahead generator 400 is the same as the number of bits of the propagation value P and the generation value G, and the number of bits of the carry output Cout is one bit.

According to the embodiments, in the secure adder 100, the secure carry-lookahead adder 150 is configured to perform operations on masked input data, and provide mask protection for the operation results. Compared with the conventional ripple-carry adders that cannot perform secure operations, the secure carry-lookahead adder 150 does not require to remove the mask of input data (i.e., the secure carry-lookahead adder 150 does not reveal the original value of the input data (or operands)), thus providing secure protection for the input signal. Moreover, the secure carry-lookahead adder 150 can use fewer logic units to complete the operation of equation (22), thereby reducing the power consumption of the secure adder and reducing the area of the IC. Thus, the manufacturing cost is decreased.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A carry-lookahead adder, comprising:
    a first mask unit configured to perform a first mask operation on first input data corresponding to a second mask value with a first mask value to obtain first masked data, wherein the first mask value is different from the second mask value;
    a second mask unit configured to perform a second mask operation on second input data corresponding to the first mask value with the second mask value to obtain second masked data;
    a first exclusive-OR (XOR) gate configured to receive the first mask value and the second mask value to provide a variable value;
    a half adder configured to receive the first masked data and the second masked data to generate a propagation value and an intermediate generation value;
    a third mask unit configured to perform a third mask operation on the propagation value with a third mask value to obtain third masked data;
    a logic circuit configured to provide a generation value according to the propagation value, the intermediate generation value and the variable value;
    a carry-lookahead generator configured to provide a carry output and a carry value according to a carry input, the generation value and the propagation value; and
    a second XOR gate configured to receive the third masked data and the carry value to provide a sum output.

2. The carry-lookahead adder as claimed in claim 1, wherein the first mask unit comprises:
    a third XOR gate configured to receive the first mask value and the first input data to provide the first masked data.

3. The carry-lookahead adder as claimed in claim 1, wherein the second mask unit comprises:
    a fourth XOR gate configured to receive the second mask value and the second input data to provide the second masked data.

4. The carry-lookahead adder as claimed in claim 1, wherein the third mask unit comprises:
    a fifth XOR gate configured to receive the third mask value and the propagation value to provide the third masked data.

5. The carry-lookahead adder as claimed in claim 1, wherein the half adder comprises:
    a first AND gate configured to receive the first masked data and the second masked data to provide the intermediate generation value; and
    a sixth XOR gate configured to receive the first masked data and the second masked data to provide the propagation value.

6. The carry-lookahead adder as claimed in claim 1, wherein the logic circuit comprises:
    a seventh XOR gate configured to receive the intermediate generation value and the variable value to provide a first intermediate data;
    a second AND gate configured to receive the propagation value and the variable value to provide a second intermediate data; and
    an eighth XOR gate configured to receive the first intermediate data and the second intermediate data to provide the generation value.

7. The carry-lookahead adder as claimed in claim 1, wherein the first input data is obtained by performing a fourth mask operation on first data with the second mask value, and the second input data is obtained by performing a fifth mask operation on a second data with the first mask value.

8. A secure adder, comprising:
    a mask generator, comprising:
        a random number generator configured to randomly generate a first mask value, a second mask value and a third mask value; and
        a first mask unit configured to perform a first mask operation on first data with the first mask value to obtain first masked data, and to perform a second mask operation on second data with the second mask value to obtain second masked data, wherein the first mask value is different from the second mask value; and
    a carry-lookahead adder, comprising:
        a second mask unit configured to perform a third mask operation on the first masked data with the second mask value to obtain third masked data;
        a third mask unit configured to perform a fourth mask operation on the second masked data with the first mask value to obtain fourth masked data;

a first exclusive-OR (XOR) gate configured to receive the first mask value and the second mask value to provide a variable value;
a half adder configured to receive the third masked data and the fourth masked data to generate a propagation value and an intermediate generation value:
a fourth mask unit configured to perform a fifth mask operation on the propagation value with the third mask value to obtain fifth masked data;
a logic circuit configured to provide a generation value according to the propagation value, the intermediate generation value and the variable value;
a carry-lookahead generator configured to provide a carry output and a carry value according to a carry input, the generation value and the propagation value; and
a second XOR gate configured to receive the fifth masked data and the carry value to provide a sum output.

9. The secure adder as claimed in claim 8, wherein the second mask unit comprises:
a third XOR gate configured to receive the second mask value and the first masked data to provide the third masked data.

10. The secure adder as claimed in claim 8, wherein the third mask unit comprises:
a fourth XOR gate configured to receive the first mask value and the second masked data to provide the fourth masked data.

11. The secure adder as claimed in claim 8, wherein the fourth mask unit comprises:
a fifth XOR gate configured to receive the third mask value and the propagation value to provide the fifth masked data.

12. The secure adder as claimed in claim 8, wherein the half adder comprises:
a first AND gate configured to receive the third masked data and the fourth masked data to provide the intermediate generation value; and
a sixth XOR gate configured to receive the third masked data and the fourth masked data to provide the propagation value.

13. The secure adder as claimed in claim 8, wherein the logic circuit comprises:
a seventh XOR gate configured to receive the intermediate generation value and the variable value to provide a first intermediate data;
a second AND gate configured to receive the propagation value and the variable value to provide a second intermediate data; and
an eighth XOR gate configured to receive the first intermediate data and the second intermediate data to provide the generation value.

14. The secure adder as claimed in claim 8, further comprising:
a bus interface configured to provide the first data and the second data from a bus to the mask generator.

15. The secure adder as claimed in claim 14, further comprising:
a selection circuit configured to selectively provide the first mask value, the second mask value, the third mask value, the first masked data and the second masked data from the mask generator or the first mask value, the second mask value, the third mask value, the first masked data and the second masked data generated by an external circuit from the bus to the carry-lookahead generator.

16. The secure adder as claimed in claim 15, further comprising:
a storage circuit coupled between the selection circuit and the carry-lookahead adder, and configured to store the first mask value, the second mask value, the third mask value, the first masked data and the second masked data from the selection circuit.

17. A method for performing carry-lookahead addition, comprising:
performing a first mask operation on first input data corresponding to a second mask value with a first mask value to obtain first masked data;
performing a second mask operation on second input data corresponding to the first mask value with the second mask value to obtain second masked data, wherein the first mask value is different from the second mask value;
obtaining a variable value according to the first mask value and the second mask value;
using a half adder to obtain an intermediate generation value and a propagation value according to the first masked data and the second masked data;
performing a third mask operation on the propagation value with a third mask value to obtain third masked data;
obtaining a generation value according to the propagation value, the intermediate generation value and the variable value;
using a carry-lookahead generator to obtain a carry output and a carry value according to a carry input, the generation value and the propagation value; and
obtaining a sum output according to the third masked data and the carry value,
wherein the first mask operation, the second mask operation and the third mask operation are performed by different exclusive-OR (XOR) gates.

18. The method as claimed in claim 17, further comprising:
performing a fourth mask operation on first data with the second mask value to obtain the first input data; and
performing a fifth mask operation on second data with the first mask value to obtain the second input data.

19. The method as claimed in claim 17, further comprising:
generating the first mask value, the second mask value and the third mask value with a random number generator.

20. The method as claimed in claim 17, wherein the half adder comprises:
an AND gate configured to receive the first masked data and the second masked data to provide the intermediate generation value; and
a XOR gate configured to receive the first masked data and the second masked data to provide the propagation value.

* * * * *